US006543477B2

(12) United States Patent
Bauer et al.

(10) Patent No.: US 6,543,477 B2
(45) Date of Patent: Apr. 8, 2003

(54) ELECTROMECHANICAL ACTUATOR

(75) Inventors: Erwin Bauer, Regensburg (DE); Wolfram Bohne, Kirchseeon (DE); Ralf Cosfeld, München (DE); Hanspeter Zink, Regensburg (DE)

(73) Assignees: Siemens Aktiengesellschaft, Munich (DE); Bayerische Motorenwerke AG, Munich (DE)

(*) Notice: Subject to any disclaimer, the term of this patent is extended or adjusted under 35 U.S.C. 154(b) by 0 days.

(21) Appl. No.: 09/993,037

(22) Filed: Nov. 14, 2001

(65) Prior Publication Data

US 2002/0059956 A1 May 23, 2002

Related U.S. Application Data

(63) Continuation of application No. PCT/DE00/01483, filed on May 11, 2000.

(30) Foreign Application Priority Data

May 14, 1999 (DE) ........................................ 199 22 423

(51) Int. Cl.[7] ................................................ F16K 37/00
(52) U.S. Cl. ................ 137/554; 251/129.16; 123/90.11
(58) Field of Search .................... 251/129.16; 137/554; 123/90.11

(56) References Cited

U.S. PATENT DOCUMENTS

| | | | | |
|---|---|---|---|---|
| 4,682,574 A | * | 7/1987 | Kreuter | 123/90.11 |
| 5,144,977 A | * | 9/1992 | Eggerton et al. | 137/554 |
| 5,617,417 A | | 4/1997 | Sathe et al. | |
| 6,002,670 A | | 12/1999 | Rahman et al. | |
| 6,078,235 A | * | 6/2000 | Schebitz et al. | 335/220 |
| 6,193,212 B1 | * | 2/2001 | Ohmi et al. | 251/129.16 |

FOREIGN PATENT DOCUMENTS

| | | |
|---|---|---|
| DE | 39 28 066 A1 | 2/1991 |
| DE | 42 07 275 A1 | 9/1993 |
| DE | 196 10 468 A1 | 2/1997 |
| DE | 297 12 502 U1 | 10/1997 |
| DE | 197 06 106 A1 | 8/1998 |
| DE | 197 45 522 A1 | 4/1999 |
| EP | 0 419 098 B1 | 3/1991 |
| WO | WO 99/39468 | 8/1999 |

* cited by examiner

*Primary Examiner*—A. Michael Chambers
(74) *Attorney, Agent, or Firm*—Laurence A. Greenberg; Werner H. Stemer; Gregory L. Mayback

(57) ABSTRACT

An electromechanical actuator has at least one electromagnet and an armature with a shank. The armature is mechanically coupled to at least one restoring device and it can move between a first bearing surface on the electromagnet and a further bearing surface. The shank is either completely hollow or it has a blind bore formed therein. A transmitter of a sensor is disposed in the cavity of the shank body.

8 Claims, 2 Drawing Sheets

ELECTROMECHANICAL ACTUATOR

CROSS-REFERENCE TO RELATED APPLICATION

This application is a continuation of copending International Application No. PCT/DE00/01483, filed May 11, 2000, which designated the United States.

BACKGROUND OF THE INVENTION

Field of the Invention

The invention relate's to an electromechanical actuator, in particular an actuator for a gas exchange valve of an internal-combustion engine.

A prior art electromechanical actuator, described in U.S. Pat. No. 6,078,235 and German utility model DE 297 12 502 U1, has two electromagnets and an armature which is mechanically coupled to two springs. The armature can move between a first bearing surface on the first electromagnet and a second bearing surface on the second electromagnet. The housing is formed with recesses for accommodating the electromagnets. For an internal-combustion engine whose gas exchange valves are driven by an electromechanical actuator of this type to operate reliably and securely, it must be ensured that the armature can move very quickly from one bearing surface to the other bearing surface and back. Only in this way is it possible to ensure that the gas exchange valves of the internal-combustion engine open and close quickly and precisely.

SUMMARY OF THE INVENTION

It is accordingly an object of the invention to provide an electromechanical actuating drive, which overcomes the above-mentioned disadvantages of the heretofore-known devices and methods of this general type and which makes it possible for gas exchange valves of an internal-combustion engine to open and close rapidly while, at the same time, keeping the energy consumption required for the actuation as low as possible.

With the foregoing and other objects in view there is provided, in accordance with the invention, an electromechanical actuator, comprising:

at least one electromagnet;

an armature having a shank formed with a cavity and movably disposed between the first bearing surface on the electromagnet and a second bearing surface;

at least one restoring device mechanically coupled to the armature; and a transmitter of a sensor disposed in the cavity in the shank.

The actuator is particularly suitable in combination with a gas exchange valve of an internal-combustion engine, where the actuator is mechanically coupled to a valve stem of the gas exchange valve.

In accordance with an added feature of the invention, the shank is a hollow tubular shaft. In an alternative embodiment, the shank is formed with a blind bore in which the transmitter is disposed.

In accordance with an additional feature of the invention, the transmitter is a permanent magnet.

In accordance with another feature of the invention, the sensor is a position sensor.

In accordance with again another feature of the invention, the transmitter is introduced into the cavity at a free end of the shank, and the shank is flanged at the free end.

In accordance with a further feature of the invention, the armature includes an armature plate formed of a cobalt-iron alloy.

In accordance with a concomitant feature of the invention, the electromagnet has a core formed of a cobalt-iron alloy.

The invention is distinguished by the fact that the shank of the armature, which is designed as a hollow body, has a significantly lower mass than a solid shank. Consequently, the armature mass which has to be moved is reduced, and therefore only small actuating forces have to be applied to move the armature plate from one armature face to the other.

Other features which are considered as characteristic for the invention are set forth in the appended claims.

Although the invention is illustrated and described herein as embodied in an electromechanical actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
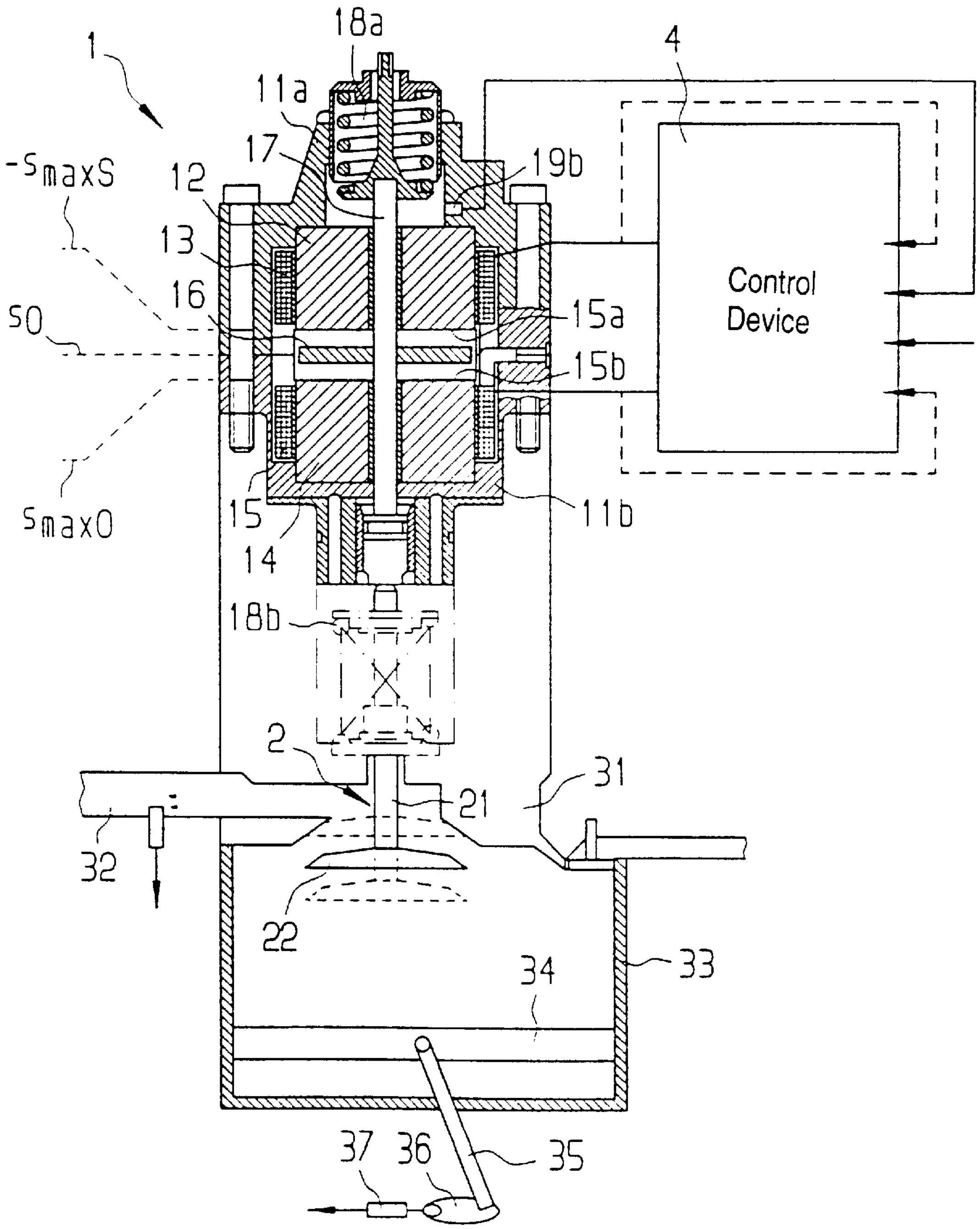
FIG. 1 is a partly sectional, partly schematic view of an actuator and a control device in an internal-combustion engine.

Referring now to the figures of the drawing in detail and first, particularly, to FIG. 1 thereof, an internal-combustion engine includes an actuator 1 which acts on a gas exchange valve 2 and is arranged in a cylinder head 31 of the internal-combustion engine. The gas exchange valve 2 is either an exhaust valve or an intake valve. The gas exchange valve 2 has a valve stem 21 and a disk or cup 22. The actuator 1 has a housing 11 wherein a first and a second electromagnet are disposed. The first electromagnet has a first core 12 which is provided with a first coil 13. The second electromagnet has a second core 14 which is provided with a second coil is. An armature is provided, the armature plate of which is arranged in the housing 11 such that it can move between a first bearing surface 15*a* of the first electromagnet and a second bearing surface 15*b* of the second electromagnet. The armature plate 16 can therefore move between a closed position $S_{maxS}$ and an open position $S_{max0}$. The armature also comprises a shank 17, which is guided through recesses in the first and second cores 12, 14 and can be mechanically coupled to the valve stem 21 of the gas exchange valve 2. A first restoring means 18*a* and a second restoring means 18*b*, which are preferably designed as springs, bias the armature plate 16 into the preset at-rest position $S_0$, i.e., the position of repose. Preferably, a receiver 19*b* of a position sensor is arranged on or in the actuator 1 in such a way that it indirectly or directly records the position of the armature plate 16 and of the armature shank 17.

The actuator 1 is rigidly connected to the cylinder head 31 of the internal-combustion engine. The intake duct 32 and a cylinder 33 with a piston 34 are provided in the internal-combustion engine. The piston 34 is coupled to a crankshaft 36 via a connecting rod 35.

A control device 4 is provided, which records the signals from various sensors. The sensors include, for example, the position sensor and/or a rotational-speed transmitter and/or a load-recording sensor. The control device 4 energizes the first and second coils 13, 15 of the actuator 1 as a function of the signals from the sensors.

Figure 2:
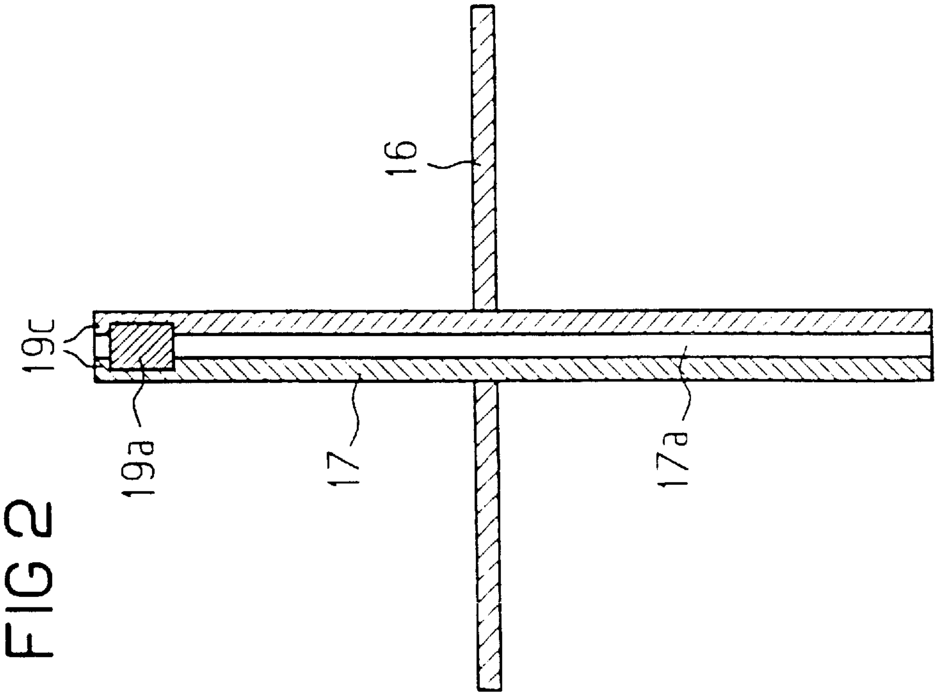
FIG. 2 is a section taken through the armature according to the invention in a first embodiment.

Referring now to FIG. 2, the shank 17 of the armature is a hollow body. For this purpose, it has a cylindrical bore which forms a cavity 17*a*. The mass of the shank 17 is therefore small, yet the shank remains sufficiently rigid to ensure stable guidance of the armature plate 16. A transmitter 19*a* is disposed in the region of a free end of the shank 17. The transmitter 19*a* is preferably a permanent magnet assigned to the position sensor. The receiver 19*b* is preferably a magnetoresistive element, preferably designed as a giant-magnetoresistive element (GMR element). Particularly simple and secure fixing of the transmitter 19*a* is ensured by flanging the free end in a region 19*c*.

Figure 3:
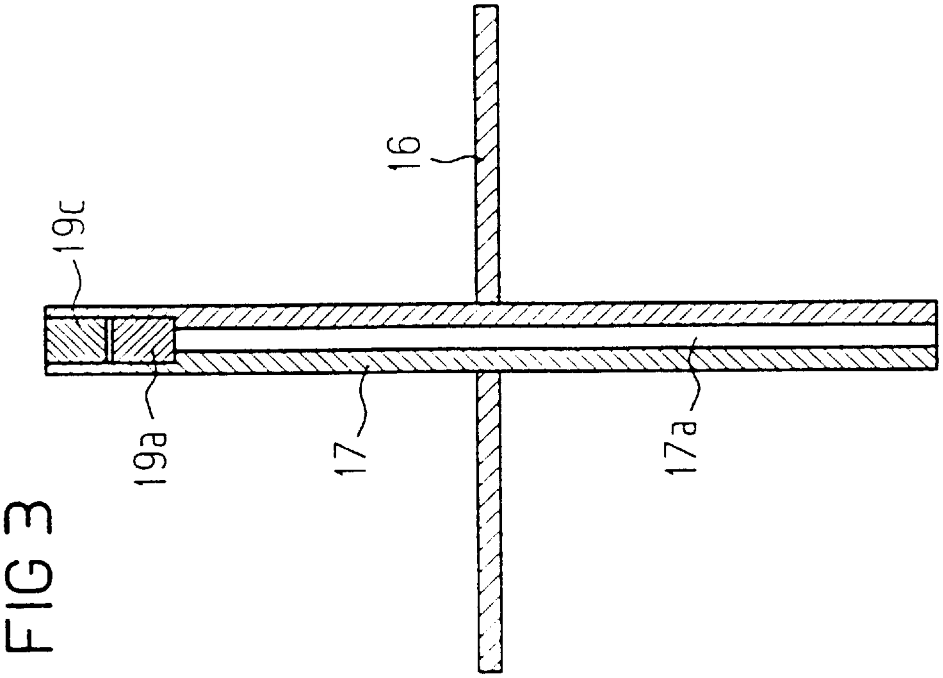
FIG. 3 is a section taken through the armature in a second embodiment.

Referring now to FIG. 3, in a second embodiment of the armature shank 17, the transmitter 19*a* is arranged at a significant distance toward the armature plate 16 from the free end of the shank 17. This makes it easy to ensure that the magnetic field generated by the transmitter 19*a* is only insignificantly interfered with by a stray magnetic field which is particularly strong at the free end of the armature shank and is caused by the magnetic circuit formed by the first or second electromagnet and the armature. Preferably, a potting compound 19*c* is introduced into the cavity 17*a* in the region of the free end and up to the transmitter 19*a*, in order to precisely fix the transmitter 19*a*. Precise fixing of the transmitter 19*a* is essential for exact recording of the position by the receiver 19*b* during a long operating period of the actuator.

Alternatively, the cavity 17*a* in the armature shank 17 may also be formed only in a partial region along the longitudinal axis of the shank, for example only in the region wherein the transmitter 19*a* is accommodated.

The moving masses of the actuator 1 are further reduced by forming the armature plate 16 from a cobalt-iron alloy. In that case, the cores 12, 14 of the electromagnets preferably also consist of the cobalt-iron alloy. The alloy has, for example, between 17 and 50% by weight of cobalt. The cobalt-iron alloy has a significantly higher electrical resistance than, for example, iron (the electrical resistance is approximately four times as high). Consequently, the eddy-current losses in the armature are lower. Compared with the silicon-iron alloys which are customarily used in electromagnets, the cobalt-iron alloy has the advantage that the saturation is reached at a magnetic induction of approximately 2.3 tesla, which is approximately 15% higher than that of the silicon-iron alloys. It is therefore possible, particularly in the case of an actuator which is provided for a gas induction valve, to reduce the size of the armature and the core, since in this case the dimensions of the core and the armature are significantly influenced by the holding force which has to be applied while the armature is bearing against one of the bearing surfaces 15*a*, 15*b*.

We claim:

1. An electromechanical actuator, comprising:

at least one electromagnet formed with a first bearing surface;

an armature having a shank formed with a cavity and movably disposed between said first bearing surface and a second bearing surface;

at least one restoring device mechanically coupled to said armature; and a transmitter of a sensor disposed in said cavity in said shank.

2. The actuator according to claim 1, wherein said shank is a tubular shaft.

3. The actuator according to claim 1, wherein said transmitter is a permanent magnet.

4. The actuator according to claim 1, wherein said sensor is a position sensor.

5. The actuator according to claim 1, wherein said transmitter is introduced into said cavity at a free end of said shank, and said shank is flanged at said free end.

6. The actuator according to claim 1, wherein said armature includes an armature plate formed of a cobalt-iron alloy.

7. The actuator according to claim 1, wherein said electromagnet has a core formed of a cobalt-iron alloy.

8. In combination with a gas exchange valve of an internal-combustion engine, the actuator according to claim 1 mechanically coupled to a valve stem of the gas exchange valve.

* * * * *